US006432715B1

(12) United States Patent
Nelson et al.

(10) Patent No.: US 6,432,715 B1
(45) Date of Patent: Aug. 13, 2002

(54) METHOD FOR MARKING ITEMS FOR IDENTIFICATION

(75) Inventors: Gregory Wayne Nelson; James John Krutak, Sr., both of Kingsport, TN (US)

(73) Assignee: Isotag Technology, Inc., Addison, TX (US)

( * ) Notice: Subject to any disclaimer, the term of this patent is extended or adjusted under 35 U.S.C. 154(b) by 0 days.

(21) Appl. No.: 09/040,864

(22) Filed: Feb. 24, 1998

(51) Int. Cl.$^7$ .............................................. G01N 21/64
(52) U.S. Cl. .......................... 436/56; 436/27; 436/172
(58) Field of Search .............................. 436/56, 22, 29, 436/172; 209/577

(56) References Cited

U.S. PATENT DOCUMENTS

| | | | |
|---|---|---|---|
| 4,053,433 A | * 10/1977 | Lee ............................ 252/408 |
| 5,039,600 A | 8/1991 | Tai et al. ...................... 430/495 |
| 5,047,312 A | 9/1991 | Albert et al. ................. 430/270 |
| 5,055,368 A | 10/1991 | Nguyen et al. ................ 430/78 |
| 5,055,500 A | 10/1991 | Peters et al. ................. 523/319 |
| 5,093,147 A | 3/1992 | Andrus et al. .................. 427/7 |
| 5,102,980 A | 4/1992 | Krutak et al. ................ 528/272 |
| 5,110,968 A | 5/1992 | Tai et al. ...................... 556/415 |
| 5,120,610 A | 6/1992 | Wegner et al. ............... 428/447 |
| 5,143,671 A | 9/1992 | Peters et al. ................. 264/117 |
| 5,169,881 A | 12/1992 | Peters et al. ................. 523/319 |
| 5,194,319 A | 3/1993 | Onaka et al. ................. 428/224 |
| 5,201,921 A | 4/1993 | Lutterman et al. ............. 8/506 |
| 5,214,188 A | 5/1993 | Tai et al. ...................... 558/419 |
| 5,218,042 A | 6/1993 | Kuo et al. .................... 524/601 |
| 5,260,052 A | 11/1993 | Peters et al. .................. 424/63 |
| 5,292,855 A | 3/1994 | Krutak et al. ................ 528/289 |
| 5,336,714 A | 8/1994 | Krutak et al. ................ 524/608 |
| 5,397,819 A | 3/1995 | Krutak et al. ................. 524/88 |
| 5,423,432 A | 6/1995 | Krutak et al. ................ 209/577 |
| 5,461,136 A | 10/1995 | Krutak et al. ................ 528/289 |
| 5,486,274 A | 1/1996 | Thetford et al. ......... 204/157.5 |
| 5,525,516 A | 6/1996 | Krutak et al. ................. 436/56 |
| 5,553,714 A | 9/1996 | Cushman et al. ............ 209/577 |
| 5,608,053 A | 3/1997 | Thetford et al. ............. 540/140 |
| 5,614,008 A | 3/1997 | Escano et al. .................. 106/23 |
| 5,645,964 A | 7/1997 | Nohr et al. ..................... 430/21 |
| 5,665,151 A | 9/1997 | Escano et al. ............ 106/31.15 |
| 5,703,229 A | 12/1997 | Krutak et al. ................ 540/140 |
| 5,922,551 A | * 7/1999 | Durbin et al. ............... 436/164 |

FOREIGN PATENT DOCUMENTS

| | | |
|---|---|---|
| GB | 1 537 375 | 12/1978 |
| GB | 2 237 804 A | 5/1991 |

OTHER PUBLICATIONS

Wheeler, Bob L., Journal of American Chemical Society, 1984, pp. 7404–7410, 106, American Chemical Society, Columbus, OH, USA.
Chemical Abstracts, 1972, p. 74, vol. 77, No. 141469m, American Chemical Society, Columbus, OH, USA.
Chemical Abstracts, 1987, p. 80, vol. 106, No. 86223s, Amercian Chemical Society, Columbus, OH, USA.
Chemical Abstracts, 1991, p. 98, vol. 114, No. 230681z, American Chemical Society, Columbus, OH, USA.
Chemical Abstracts, 1991, p. 744, vol. 114, No. 196444n, American Chemical Society, Columbus, OH, USA.
Chemical Abstracts, 1991, p. 744, vol. 114, No. 196445p, American Chemical Society, Columbus, OH, USA.
Chemical Abstracts, 1991, p. 742, vol. 114, No. 196418g, American Chemical Society, Columbus, OH, USA.

* cited by examiner

*Primary Examiner*—Lyle A. Alexander
(74) *Attorney, Agent, or Firm*—George R. Schultz

(57) ABSTRACT

A method for marking or tagging individual microparticles using a near infrared fluorophore for identification is provided. The near infrared fluorophore is included with one or more layers comprising the microparticle. Desirably, the coating layers contain colorants such as dyes and/or pigments which increases the total possible combinations that may be used to identify the marked material. There is further provided a method for marking a material using these microparticles containing a near infrared fluorophore.

10 Claims, No Drawings

METHOD FOR MARKING ITEMS FOR IDENTIFICATION

BACKGROUND OF THE INVENTION

The present invention relates to an improved method for marking individual microparticles of a substance for the purpose of subsequent identification. A further aspect of the invention relates to the microparticles themselves which include therein a near infrared fluorophore.

There has long been interest in methods for identifying various substances by incorporating materials which provide, possibly in coded form, information about the source, date, and lot or batch number of the material. Although there are other obvious applications for such "taggants", the need for identification of explosives and certain bulk chemicals which can be used to make explosives has become increasingly urgent with the increase in the use of explosives in terrorism. It is desirable for the manufacturer to be able to incorporate small particles ("microtaggants") into an explosive, some of which will survive the explosion, and which upon recovery from the debris of the explosion will provide information about the manufacturer, as well as the date of manufacture and the particular lot of the explosive. Reference to the manufacturer's records would make it possible to trace the explosive to the final seller and possibly to the ultimate purchaser.

There are many occasions on which it is necessary or desirable to mark items or materials so that ownership or the original manufacturer can be established. It is also frequently desired to include in the identification information such as the date of manufacture and, in case the items are made in different batches or lots, the particular lot with which the item is associated.

A color code of some sort is, of course, an obvious method of identification and a system of this sort has been used for many years for indicating the resistance value of small electrical resistors and capacitors. For resistors, colored bands corresponding to the first and the second significant figures of the resistance value, followed by a third band corresponding to a decimal multiplier provide a simple code. The color of each band further provides a multiplier for that band. Additional bands may be used to indicate the percent tolerance, or accuracy, of the indicated resistance value, and the percent change in resistance value per 1000 hours of use.

U.S. Pat. Nos. 4,053,433 and 4,390,452 (Minnesota Mining & Manufacturing Co.) contain reviews of a number of methods for identifying units of production of bulk substances with identifying microparticles having properties different from the properties of particles previously determined to be present in the bulk material. Analytical methods used to identify such particles include microscopy (for size, shape, color, phosphorescence, or fluorescence); determination of density, hardness, or trace ingredients; or spectrometry to measure light absorption; fluorimetry; or reflectance. More specific examples include tagging with refractory microparticles containing low levels of elements such as manganese, cobalt, zinc, etc. The identity and amount of each of which may be varied to provide an identification code. It is obvious that these methods are not adaptable to coding for more than a very small amount of information.

Isotopes of the various elements may be used in the same way. However, complicated equipment not readily available to law enforcement personnel is required for identification.

U.S. Pat. No. 4,053,433 describes the use of microparticles which are encoded with an orderly sequence of visually distinguishable colored segments. Decoding of the microparticles can be accomplished with the aid of a microscope or other magnifying device. According to this patent, identification is provided by incorporating the encoded microparticles into the substance and subsequently examining the substance for encoded microparticles. In practice, the microparticles consist of refractory particles containing bands of various colors, which are ordered in the polymer to provide a code which may be read under a microscope. By using this technique, it is possible to provide up to $C^*(C-1)^{n-1}$ uniquely coded batches, where C is the number of available colors and n is the number of segments in the color sequence. According to this formula, if a library of 12 colors is used in an eight-layered sequence, with no color adjacent to itself, a total of 233,846,052 codes are possible if the code is read in one direction. Half that number of codes is possible if the colors are arranged so that the same code may be read in either direction. The broadest dimension across the color sequence of the particles is between 1 and 1000 microns, and preferably between 50 microns to 250 microns.

Although this method is extremely flexible and provides a large number of codes, the desired size of the particles requires that the coding colors be laid down with great accuracy and in extremely thin layers. Since each layer can contain only one visible color, the maximum number of layers for a very small particle is four. Assuming that seven different colors are available for use, the number of possible codes is 756.

U.S. Pat. No. 4,390,452 describes an improvement over U.S. Pat. No. 4,053,433 in which the microparticles contain at least one flat surface which bears identifying indicia selected from alphanumerics and symbols which can be visually interpreted under magnification. According to this patent, this top layer is photosensitive, so that the identifying indicia may be applied to the surface by exposing it to an ultraviolet light.

The prior art cited in U.S. Pat. Nos. 4,053,433 and 4,390,452 is included herein by reference.

Taggants have been used in Switzerland for the identification of explosives since about 1980. These include "microtaggants" such as those described in U.S. Pat. Nos. 4,053,433 and U.S. 4,390,452; and those available commercially, such as "HF-6" (Swiss Blasting AG), which has a code consisting of several layers of color, each of which represents a distinctive feature of this particular product; and "Explotracer" (Societe Suisse des Explosifs), which consists of a basic polymer marked with fluorescent pigments and rare earth elements. The code is based upon the melting point of the polymer and the identity of the elements which are included in it.

It is necessary not only for the taggant particles to be identifiable, but they must also be isolated for identification. Especially in the case of an explosion, the very small particles are widely scattered and must be separated and isolated from a large amount of extraneous debris. This has been done by incorporating finely divided iron or other magnetic particles in the micro taggants, or by incorporating ultraviolet dyes or pigments which render them visible when illuminated by ultraviolet light. However, magnetic material is almost universally dispersed in the environment, and a large amount of extraneous material is inevitably recovered with the microtaggant.

The incorporation of ultraviolet fluorescent material as an aid to locating the microtaggants is also subject to a great deal of interference. Many materials which are present in the environment also fluoresce in the UV region so that, again, isolating the microtaggant from extraneous material is complicated. UV fluorescence is also easily quenched or masked by other materials which may be present in the debris from an explosion. Another disadvantage of using a UV fluorescent compound is that it must be place on one of the exposed surfaces of the microtaggant since most pigments and dyes used to make a layered microtaggant would interfere with the UV fluorescent material by absorbing the fluorescent light. (*The Physics and Chemistry of Color The Fifteen Causes of Color*, Kurt Nassau, pp. 4–19, U.S. (1983)). Finally, materials which fluoresce in the visible region are difficult or impossible to detect during examination of debris in daylight or artificial light.

Accordingly, there is a need for a microparticle taggant that can readily be identified and that overcomes the above described disadvantages.

SUMMARY OF THE INVENTION

Briefly, the present invention provides for a method for identifying and/or locating solid particulate materials by incorporating a marker or taggant into the materials. In accordance with the invention, the marker or taggant is a near infrared fluorophore which is readily detected and identified by using an appropriate detection device known to those skilled in the invisible marking art.

It is another aspect of the invention to provide an encoded microparticle having a near infrared fluorophore incorporated therein. Desirably the microparticle has a plurality of distinguishable juxtaposed layers and the near infrared fluorophore is incorporated into at least one of the layers.

It is an object of the invention to provide a method for identifying a material by including a microparticle therein. More particularly, it is an object of the invention to provide a means for identifying a material by incorporating a near infrared fluorophore compound into the microparticle.

It is another object of the invention to provide a microparticle which can be used to carry out the method of the invention.

Advantageously, the present method and microparticles used therein can be of any desired shape, including spherical, cylindrical, polyhedral or any other shape that may facilitate or assist in the identification of the material incorporating the near infrared fluorophore.

Numerous other objects and advantages of the present invention will become readily apparent from the following detailed description of the preferred embodiments and the appended claims.

DETAILED DESCRIPTION OF THE PREFERRED EMBODIMENTS

The present invention relates to a method for marking items or materials, particularly those which are intended to be sold or used in commerce in solid or particulate form, with a large amount of coded information useful for identification. The present invention further relates to a microparticle useful in the method of the invention.

The microparticle of the invention has incorporated therein at least one near infrared fluorophore in a sufficient amount to permit detection of the microparticle. Advantageously, the near infrared fluorophore permits the microparticle to be readily detected using means and methods known to those skilled in the art of detecting fluorescing compounds. With regards to the microparticles themselves, in one embodiment, the microparticle has a spherical shape and includes a center portion or nucleus. The sphere may further include one or more layers of colored or dyed layers of material concentrically coated to encapsulate the nucleus. Each layer coated on the nucleus has a thickness of from about 5 microns to about 25 microns with from about 5 to 15 microns being preferred. In accordance with the invention, the nucleus and/or one or more layers of the coating material contains a near infrared fluorophore.

The core or nucleus of the microparticle may be any monofilament having a diameter sufficiently small to meet the prescribed requirements, desirably from about 25 to about 250 microns and more desirably from about 25 to about 200 microns. It is possible to build concentric layers up around the monofilament nucleus so that the microparticle comprises a plurality of layers encoded by a sequence of visually distinguishable dyed or pigmented layers, where at least one layer includes a near infrared fluorophore. In a preferred embodiment, the microparticle has at least three (3) layers and a diameter of from about 1 micron to about 1000 microns at its broadest dimension across the color sequences.

Choice of materials comprising the core or nucleus of the microparticle will depend, in part, on the material to be marked or tagged, their ultimate use, the ability of the microparticle to survive further processing, and the ability of forming a sufficiently strong bond with the immediate surrounding layer. Suitable core materials for most purposes include plastics such as polyolefins and polyacrylates, polyesters, modified cellulose, waxes, glass bubbles and biodegradable materials such as albumin, gum, gelatin, and polyvinylpyrrolidone.

The colored layers encircling the core may be applied to the core by conventional methods including fluid or spouting bed, ball mill, dipping, or pharmaceutical pill coating processes. A preferred method for applying a layer to a spherical microparticle is through the use of a Wurster coater as described in U.S. Pat. No. 3,241,520. The color resin may be dissolved or dispersed in a fugitive solvent, or if the pigment exists in a liquid system of low viscosity, or it may be applied without using a solvent.

Another advantage of the present invention is that the microparticles are not limited to different geometric configuration to facilitate their separation or recognition from the bulk material into which they are incorporated, although such geometrical configurations are within the scope of the invention. Accordingly, the microparticle may be any shape including spherical, cylindrical, polyhedral or any other shape which may further facilitate or assist in the identification of the material incorporating the near infrared fluorophore.

In another embodiment of the invention, the microparticles consist of a plurality of pieces of colored plastic films fused together to form a rectangular hexahedron having color segments in sequence with the layers generally parallel to one face. The thickness of each film can be from about 12 microns to about 200 microns.

In another embodiment, the microparticles are a plurality of layers formed from sheets of a different colored organic cross-linkable resin which is sufficiently flexible and resilient to form a wide sheet of good integrity. The near infrared fluorophore compound is incorporated into at least one of these layers. After forming a predetermined number of identification layers, desirably, they are crosslinked to form a brittle state which is easily comminuted at room temperature into the desired sizes. Alternatively, the sheet may be chilled until brittle. If this is impracticable, the sheet can be fibrillated and the resultant fibers chopped to provide desirably small microparticles.

Such layered microparticles can be manufactured by the process of making an organic sheet of substantially uniform thickness, desirably having a total thickness not exceeding 500 microns, and preferably less than about 250 microns. The sheet may be formed on a flexible carrier having a low-adhesion surface but should have sufficient rigidity and strength so that the carrier can be cleanly peeled away. In order to build the sheet up to a uniform thickness, it may be desirable to sequentially apply a number of layers and desirably each layer is of a visually distinguishable color. Each layer may have a thickness of less than about 100 microns, desirably less than about 50 microns and preferably from about 5 microns to about 25 microns. The sheet is then comminuted at random to form a batch of microparticles, each having two flat surfaces, generally parallel to each other. Each microparticle has substantially the same thickness. The other surfaces of the microparticle may have irregular shapes.

The broadest dimension across the color sequence of the microparticle(s) described herein may be from 1 micron to about 1000 microns, but upper limits of 250–300 microns are preferred in order to provide large numbers of microparticles per unit weight. The preferred microparticles for use in the present invention range from 50 to 1000 microns at the broadest dimension. Advantageously, the size of the microparticle is not of any significance since such particles are detected through fluorescence. One skilled in the art will appreciate that the microparticles of the invention do not have to be visually observed under magnification for identification.

Any material which is capable of surviving explosive conditions (generally temperatures greater than about 300° C. for as long as a few seconds) may be used in forming the layers of the microtaggant particle. Many known thermoset resins and highly crosslinked resins are suitable. Some thermoplastic resins may also be suitable. A preferred material is a melamine/formaldehyde resin. It should also be appreciated that the composition of various resin layers may vary.

In a preferred embodiment, the microparticle can include a plurality of coating layers and at least two near infrared fluorophores, and more desirably, each fluorophore having a distinct and identifiable absorbance and fluorescence. The coating layer may be any material suitable for having dyes and/or a near infrared fluorophore admixed and/or copolymerized therein or coated thereon. Non-limiting examples of such materials include resins, cellulosic derivatives, polyesters, polyurethanes, polyamides and epoxy.

Suitable dyes or pigments which impart visual color to the particle layers are generally known in the art, and include, for example, inorganic pigments such as sulfates, chromates, sulfides, oxides, carbonates, and organic stable pigments. Suitable colors include red, blue, orange, black, violet, brown, yellow, fluorescent red, white, green, and fluorescent green. Such colorants are described in U.S. Pat. No. 4,255,273, the disclosure of which is incorporated herein by reference. Most frequently the visual dye or pigment is incorporated into the polymer by admixing the constituents. Generally only one color is incorporated into each layer to avoid color contamination. The near infrared fluorophores, which are described fully below, are used with or without other established marking methods.

The near infrared fluorophores of the invention possess excellent thermal stability and little light absorption in the visible region; that is, they must not impart interfering color to the particle layer in which they are incorporated. Also, they should have strong absorption of near infrared light (high molar extinction coefficients, e.g. >20,000) and have a strong fluorescence maximum in the near infrared between the wavelengths of about 670 to about 2500 nm. Suitable stability to sunlight and fluorescent light and low extractability or sublimation from the thermoplastic compositions are also preferred. To insure minimal interference with any visual color which is also added to a particular layer, the near infrared fluorophores preferably absorb little if any light having wavelengths in the 400–700 nm range; however, since the compounds are present in extremely low concentrations, a small amount of absorption may be tolerated without imparting significant color.

A class of preferred near infrared fluorophores useful in the practice of the invention are selected from the classes of phthalocyanines, naphthalocyanines and squaraines (derivatives of squaric acid) and correspond to Formulae I, II and III:

(I)

(II)

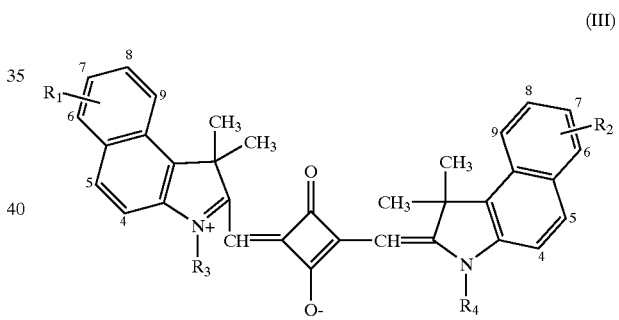

(III)

wherein Pc and Nc represent the phthalocyanine and naphthalocyanine moieties of Formulae Ia and IIa,

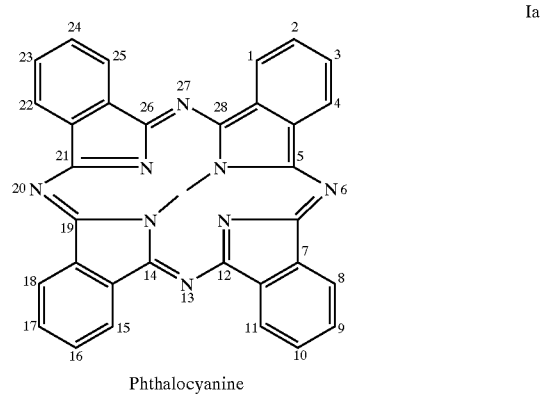

Ia

Phthalocyanine

-continued

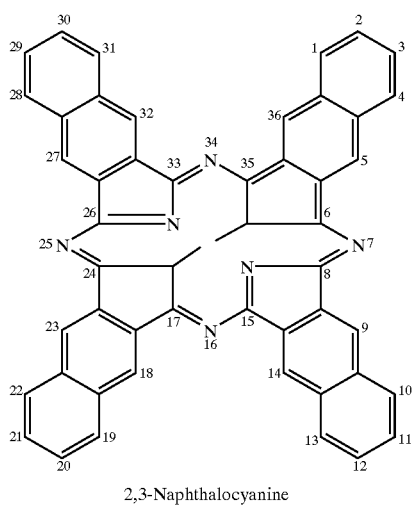

2,3-Naphthalocyanine respectively, covalently bonded to hydrogen or to various metals, halometals, organometallic groups, and oxymetals including AlCl, AlBr, AlF, AlOH, AlOR$_5$, AlSR$_5$, Ge, Ge(OR$_6$), Ga, InCl, Mg, SiCl$_2$, SiF$_2$, SnCl$_2$, Sn(OR$_6$)$_2$, Si(OR$_6$)$_2$, Sn(SR$_6$)$_2$, Si(SR$_6$)$_2$, or Zn, wherein R$_5$ and R$_6$ are selected from hydrogen, alkyl, aryl, heteroaryl, lower alkanoyl, trifluoroacetyl, groups of the formulae:

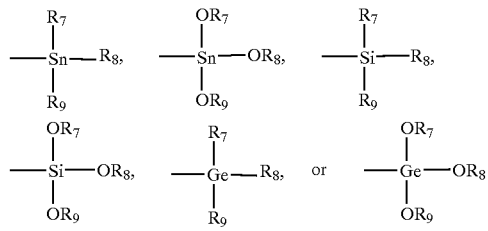

R$_7$, R$_8$ and R$_9$ are independently selected from alkyl, phenyl or phenyl substituted with lower alkyl, lower alkoxy or halogen.

X is selected from oxygen, sulfur, selenium, tellurium or a group of the formula N(R$_{10}$), wherein R$_{10}$ is hydrogen, cycloalkyl, alkyl, acyl, alkylsulfonyl, or aryl or R$_{10}$ and R taken together form an aliphatic or aromatic ring with the nitrogen atom to which they are attached.

Y is selected from alkyl, halogen or hydrogen.

R is selected from unsubstituted or substituted alkyl, alkenyl, alkynyl, C$_3$–C$_8$ cycloalkyl, aryl, heteroaryl,

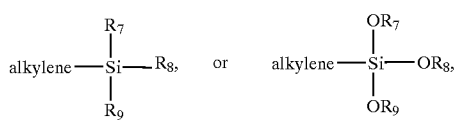

(X—R) moiety is alkylsulfonylamino, arylsulfonylamino, or a group selected from the formulae —X(C$_2$H$_4$O)$_z$R$^1$,

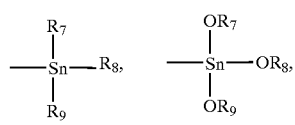

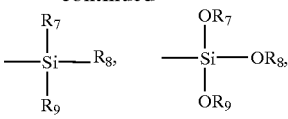

wherein R$^1$ is hydrogen or R as defined above; z is an integer of from 1–4.

Further two (X—R) moieties can be taken together to form divalent substituents of the formula:

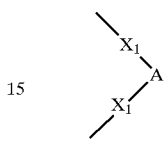

wherein each X$_1$ is independently selected from —O—, —S—, or —N(R$_{10}$) and A is selected from ethylene; propylene; trimethylene; and such groups substituted with C$_1$–C$_4$ alkyl, C$_1$–C$_4$ alkoxy, aryl and cycloalkyl; 1,2-phenylene and 1,2-phenylene containing 1–3 substituents selected from C$_1$–C$_4$ alkyl, C$_1$–C$_4$ alkoxy, or halogen.

R$_1$ and R$_2$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy,

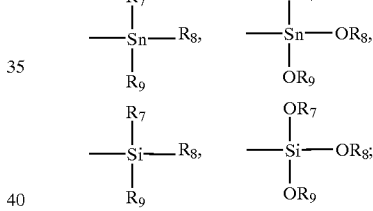

R$_3$ and R$_4$ are independently selected from hydrogen, lower alkyl, alkenyl or aryl; n and m can be an integer from 0–16, and n$_1$ and m$_1$ can be an integer from 0–24 provided that the sums of n+m and n$_1$+m$_1$ are 16 and 24, respectively. It is to be understood that when n, m, n$_1$ and m$_1$ is 0 the respective moiety is absent.

In a preferred embodiment of this aspect of the present invention m is from 4 to 12; m$_1$ is from 0–8; provided that in the definitions of the substituents (Y)n$_1$ (Y)n, and (X—R) m$_1$ that these substituents are not present when n, n$_1$ and m$_1$ are zero, respectively. Substituents (X—R) and (Y) are present in compounds Ia on the peripheral carbon atoms, i.e., in positions 1, 2, 3, 4, 8, 9, 10, 11, 15, 16, 17, 18, 22, 23, 24, 25 and substituents (X—R) and (Y) are present on the peripheral carbon atoms of IIa, i.e., in positions 1, 2, 3, 4, 5, 9, 10, 11, 12, 13, 14, 18, 19, 20, 21, 22, 23, 27, 28, 29, 30, 31, 32 and 36.

In the above definitions, the term alkyl is used to designate a straight or branched chained hydrocarbon radical containing 1–12 carbons.

In the terms lower alkyl, lower alkoxy, lower alkylthio, lower alkoxycarbonyl, lower alkanoyl and lower alkanoyloxy the alkyl portion of the groups contains 1–6 carbons and may contain a straight or branched chain.

The term "cycloalkyl" is used to represent a cyclic aliphatic hydrocarbon radical containing 3–8 carbons, preferably 5 to 7 carbons.

The alkyl and lower alkyl portions of the previously defined groups may contain as further substituents one or more groups selected from hydroxy, halogen, carboxy, cyano, $C_1$–$C_4$-alkoxy, aryl, $C_1$–$C_4$-alkylthio, arylthio, aryloxy, $C_1$–$C_4$-alkoxycarbonyl or $C_1$–$C_4$-alkanoyloxy.

The term "aryl" includes carbocyclic aromatic radicals containing 6–18 carbons, preferably phenyl and naphthyl, and such radicals substituted with one or more substituents selected from lower alkyl, lower alkoxy, halogen, lower alkylthio, N(lower alkyl)$_2$, trifluromethyl, carboxy, lower alkoxycarbonyl, hydroxy, lower alkanoylamino, lower alkylsulfonylamino, arylsulfonylamino, cycloalkylsulfonylamino, lower alkanoyloxy, cyano, phenyl, phenylthio and phenoxy.

The term "heteroaryl" is used to represent mono or bi-cyclic hetero aromatic radicals containing at least one "hetero" atom selected from oxygen, sulfur and nitrogen or a combination of these atoms. Examples of suitable heteroaryl groups include: thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure IV and mixed isomers thereof,

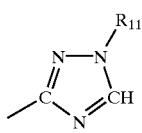

IV wherein $R_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl and alkynyl" are used to denote aliphatic hydrocarbon moiety having 3–8 carbons and containing at least one carbon-carbon double bond and one carbon-carbon triple bond, respectively.

The term halogen is used to include bromine, chlorine, fluorine and iodine.

The term "substituted alkyl" is used to denote a straight or branched chain hydrocarbon radical containing 1–12 carbon atoms and containing as substituents 1 or 2 groups selected from hydroxy, halogen, carboxy, cyano, $C_1$–$C_4$ alkoxy, aryl, $C_1$–$C_4$ alkylthio, arylthio, aryloxy, $C_1$–$C_4$ alkoxycarbonyl, or $C_1$–$C_4$ alkanoyloxy.

The term "substituted carbamoyl" is used to denote a radical having the formula —CONR$_{12}$R$_{13}$, wherein R$_{12}$ and R$_{13}$ are selected from unsubstituted or substituted alkyl, alkenyl, alkynyl, cycloalkyl, aryl, or heteroaryl.

The term "substituted sulfamoyl" is used to denote a radical having the formula —SO$_2$NR$_{12}$R$_{13}$, wherein R$_{12}$ and R$_{13}$ are as defined above.

The term "alkylene" refers to a divalent $C_1$–$C_2$ aliphatic hydrocarbon moiety, either straight or branched-chain, and either unsubstituted or substituted with one or more groups selected from lower alkoxy, halogen, aryl, or aryloxy.

The term "acyl" refers to a group of the formula R°C(O)—O—, wherein R° is preferably a $C_1$–$C_{10}$ alkyl moiety. The term "alkyl sulfonyl" refers to a group of the formula R°SO$_2$—, wherein R° is as defined for acyl.

Greater detail as to these near infrared fluorophore compounds and methods for making the compounds are further described in U.S. Pat. Nos. 5,397,819; 5,461,136; 5,525,516; and 5,553,714, the disclosures of which are incorporated herein by reference.

As noted above, the near infrared fluorescing compounds having reactive groups present may be copolymerized to produce thermoset compositions containing the near infrared fluorophore covalently bound so that they will not be leachable, sublimable, extractable, or be exuded from the polymer composition.

The dyes, pigments and near infrared fluorophores may be used alone in each layer, in combination with each other in a layer or in further conjunction with colored bands as described in U.S. Pat. No. 4,053,433.

Incorporating one or more near infrared fluorophores, each of which has a characteristic fluorescence emission, in addition to the colorant in each colored band greatly increases the number of possible codes. For example, according to the formula cited above, if a particle is prepared which contains five bands (n=5), and five different colors (c=5) can be used in each band with no color touching the same color on an adjoining band, so arranged that the code can be read in either direction, $((5)(5-1)^4)/2=640$ possible codes are possible. If, on the other hand, each colored layer can contain a near infrared fluorophore, the number of detectible "colors" is doubled (e.g., red and red+ near infrared fluorophore are two different colors) and the number of possible codes, readable in either direction, is $((10)(9)^4)/2=32,805$. Thus, incorporation of near infrared fluorophores in the colored layers permits information to be encoded in fewer layers, thus simplifying the manufacture of the particles as well as making reading the codes easier.

Normally, with suitable fluorescence efficiency, the near infrared fluorophore is added in the amount of from less than about 1000 ppm, desirably from about 0.5 ppm to about 100 ppm, with about 1 ppm to about 10 ppm being preferred.

The method of the invention is particularly well suited for tagging bulk materials such as chemicals, explosives and liquid products such as non-opaque lacquers and resins. Desirably, the microparticles are homogeneously incorporated into the substrate to be tagged, preferably in an amount ranging from 0.01 ppm to about 1000 ppm, more preferably from about 0.1 ppm to about 100 ppm and yet more preferably from about 1 ppm to about 10 ppm. The use of near infrared fluorophores in colored taggant particles also provides an improved method of detection and recovery of particles, particularly after the tagged particles have been dispersed in the environment, as by explosion. Prior to the present invention, it had been necessary to retrieve the microtaggants using such methods as visually identifying the taggant or collecting a particle having a magnetic additive using a strong magnet. However, the present invention has an advantage over the prior art teachings by using an imaging system and a laser selected to deliver light at the absorbance maximum of the near infrared fluorophore contained in the taggant, a sweep of an area can be conducted to detect dispersed particles, without disturbing the explosion scene. A suitable imaging systems includes, but is not limited to, a video capture system comprising a video monitor, video storage device and a CCD camera equipped with appropriate filters to reject the reflected laser light and accept fluorescence from the near infrared fluorophore tagged particles. Thus, patterns or trails of particles can be detected and recorded to provide a map of tagged particles. In the case of an explosion, those skilled in the art of investigation of explosive patterns can use this information to pinpoint the source of the explosion as well as the type of explosive material used in the explosion.

In the case of covertly tagged articles, patterns of near infrared fluorophores printed or otherwise affixed to an articles can be detected. Because there are few natural interferences to near-infrared fluorescence, this detection method can be accomplished in lighting conditions ranging from full sunlight to darkness. Non-imaging devices such as disclosed in U.S. Pat. Nos. 5,461,136; 5,397,819; and 5,292,855 can also be used to rapidly locate and map dispersed particles.

The near infrared fluorophore may be incorporated into or onto suitable microparticles in a number of ways. For example, the near infrared fluorophore may be incorporated into a suitable coating and applied to the surface of the microparticle. Alternatively at least one near infrared fluorophore may be copolymerized with one or more of the materials useful in forming a coating layer.

The use of near infrared fluorophores as components of coded identification systems presents a number of advantages. In general, any of the near infrared fluorophores cited above may be used, provided only that they do not undergo destructive reactions with other ingredients or reaction products of the substrate. Near infrared fluorophores which react with formaldehyde, for example, should not be used in conjunction with melamine resins, which release formaldehyde during cure.

Although the examples have dealt with near infrared fluorophores which are incorporated into brittle, cross-linked resins, they may also be copolymerized into water-dispersible resins which are suitable for coatings (U.S. Pat. Nos. 5,292,855; 5,336,714 and 5,423,432, incorporated herein by reference); alternatively, certain near infrared fluorophores are available in oil-soluble form and may be incorporated into the solvent system used in resin preparation (U.S. Pat. No. 5,525,516) and may be introduced into coatings, including cross-linkable coatings, in that way. These coatings may be applied between or on top of other microtaggant layers (which may or may not include visual colorants) to provide more variations without significantly increasing the size of the final taggant particle.

Suitable resins may be marked with near infrared fluorophores by any of the conventional methods for adding additives such as dry blending, solution blending, etc. Alternatively, certain near infrared fluorophores are available which contain reactive groups which may be copolymerized into, the polymer. Near infrared fluorophores may be incorporated into cellulose acetate by a technique known as "acid pasting". These polymers may be used per se as marking layers, or they may be blended with other components of a marking layer.

Although the discussion herein has been directed primarily to the use of near infrared fluorophores as components of microtaggants for use in marking explosives, there are many other forms in which they may be used. For example, rods of thermoplastic may be prepared by extruding successive near infrared fluorophore-marked layers of the same or a different compatible, polymeric material. These rods may be cut into pellets similar to the form in which commercial thermoplastics are sold. Blended into a batch of plastic, they serve for identification in the same way that microtaggants are used for explosive identification. They would be easy to locate and identify in a batch of polymer, even one which contained fluorescent brighteners or ultraviolet absorbers, by virtue of their unique near infrared fluorescence.

It would also be possible to spin layered fibers from them which would reveal, upon cross sectioning, the manufacturer and the identity of the fabric from which a fiber was spun. It is common practice to spin synthetic fibers which have non-circular cross sections; for example, a common form has the shape of a Y. Each limb of the Y might be marked with a different near infrared fluorophore. Many other cross sections are possible; commercial spinneret designs permit the manufacture of at least eight unique cross sections for synthetic fibers, each lobe of which might be marked with a different near infrared fluorophore.

Coded disks, rods, etc. may be made by laying down successive layers of near infrared fluorophore-containing thermoplastic film, heating them under pressure to fuse the mass together, and cutting the resulting billet into disks, rods, or other desired shape.

Beads of polymer which contain successive layers of different near infrared fluorophores can be made by successively coating ceramic or, for example, cross-linked polystyrene beads with either oil soluble or water-dissipatable near infrared fluorophores. The bead may be cross-sectioned to reveal the code in the successive layers of tagged polymer.

It is emphasized that, in every case in which an application for a near infrared fluorophore has been indicated, it is also within the scope of the invention to incorporate a visible dye or pigment along with the near infrared fluorophore to increase the number of possible codes. Suitable polymeric colorant technology for coloration of melt processable polymers and aqueous or oil solvent-based coating compositions are disclosed in U.S. Pat. Nos. 4,403,092 and 5,376,650, which are incorporated herein by reference.

If desired, ferromagnetic materials such as iron powder may also be incorporated into the microtaggants to further facilitate their collection from the environment.

The following examples are given by way of illustration of the invention and are not intended to be a limitation thereof.

EXAMPLES 1–10

This example illustrates the preparation of a coating such as could be applied to the surface of a microtaggant so that the particle could be located by exposure to near infrared light. The near infrared fluorophore can serve alone as a device for visualizing and locating microtaggant dispersed in the environment, or for identification of the manufacturer or country of origin, etc. Since near infrared fluorophores are visible through a clear coating when they are illuminated by near infrared light of the appropriate frequency, while they do not fluoresce when exposed to ultraviolet light, this coating may be applied beneath the photosensitive coating described in U.S. Pat. No. 4,390,452 to provide additional information. As further examples will show, a similar technique may be used to prepare individual layers or a multilayer microtaggant particle.

The marker composition was added to a homogeneous mixture of 2 grams each of an alkylated melamine resin (Cymel™ 248-8) and an alkyd resin (Beckosol™ 12-102) and stirred thoroughly to give a clear solution. Cymec™ 4040 catalyst (a solution of p-toluenesulfonic acid in isopropanol), 0.1–0.4 grams was stirred into the mixture, which was then coated on thin polyethylene terephthalate film, or on white copy paper, using a 2 mil coating bar. The coated samples were heat set on a heated block at 120–140° C. for a few minutes to give clear, non-tacky films. The coated samples were illuminated by near infrared light at 780 nm and the fluorescence at 800–830 nm was measured using detectors described in U.S. Pat. Nos. 5,292,855; 5,336,714; 5,397,819; 5,423,432; 5,461,136; and 5,525,516. The disclosures of each are incorporated herein by reference.

The results for a variety of near infrared fluorophores (NIRFs) at different concentrations are shown in Table I below.

TABLE I

| Example | NIRF[a] | NIRF in Coating (weight, mg) | Catalyst (weight, mg) | Detector Response Film | Detector Response Paper |
|---|---|---|---|---|---|
| 1 | $(C_6H_5)_4NcAlCl$ | 1.6[b] | 0.1 | Yes | Yes |
| 2 | $(t-Bu)_4NcAlOH$ | 1.6[b] | 0.1 | Yes | Yes |
| 3 | $NcSi[O(PEG)OMe]_2$ | 1.6[b] | 0.1 | Yes | Yes |
| 4 | $(2-EthexylNH)_4PcH_2$ | 1.6[b] | 0.1 |  | Yes |
| 5 | $NcSi(OH)_2$ | 210[c] | 0.11 | Yes | Yes |
| 6 | $NcSi(OH)_2$ | 210[c,e] | 0.11 | Yes | Yes |
| 7 | $NcSi(OH)_2$ | 250[d] | 0.25 |  | Yes |
| 8 | $NcSi(OH)_2$ | 400[c] | 0.1 | Yes | Yes |
| 9 | $NcSi(OH)_2$ | 400[c] | 0.4 | Yes | Yes |
| 10 | $NcSi(OH)_2$ | 430[c] | 0.23 | Yes | Yes |

[a]Nc = the naphthalocyanine nucleus
Pc = the phthalocyanine nucleus
PEG = polyethylene glycol 200
[b]0.1 g in tetrahydrofuran
[c]5000 ppm as copolymer with sebacic acid and PEG
[d]2000 ppm in polyurethane
[e]+0.2 g toluene

EXAMPLES 11–15

Several kilograms of a base coating resin were prepared by combining equal parts of an alkylated melamine resin (Cymel™ 248-8) and an alkyd resin (Beckosol™ 12-102) and shaking thoroughly to give a clear homogenous solution. Cymec™ 4040 catalyst (a solution of p-toluenesulfonic acid in isopropanol). 2.5 to 10% by weight, was stirred into the mixture. The mixture was divided into portions and colored pigments were added to give red, green fluorescent, white, and black coating compounds designated R, F, W, and B respectively. A portion of the red and fluorescent green coating solutions were separated and near infrared fluorophores were added in the amounts shown in Table II below.

TABLE II

| Example | Layer Pigment Color | NIRF | Concentration (ppm) | Designation |
|---|---|---|---|---|
| 11 | Red | $(t-Bu)_4NcAlOH$ | 110 | (NR) |
| 12 | Fluorescent Green | $(t-Bu)_4NcAlOH$ | 75 | (NF1) |
| 13 | Fluorescent Green | $(t-Bu)_4NcAlOH$ | 38 | (NF2) |
| 14 | Fluorescent Green | $NcSi(OH)2^f$ | 150 | (NF3) |
| 15 | Fluorescent Green | $NcSi(OH)2^f$ | 75 | (NF4) |

[f]5000 ppm as copolymer with sebacic acid and PEG

Taggant particles were prepared by spreading the coating resins described above onto a web using coating bars and curing with heat. Multiple layer taggants were generated by spreading one color resin over a partially cured layer of another color resin and building up a desired number of layers. The cured coatings were removed from the web and passed through a Wiley mill with #16 mesh to give taggant particles. All of these particles registered a "Yes" on the detector device described in examples 1–10. Table III illustrates the multi-layer particle codes using the designations described above. These particles were also seen by illuminating the particles with a laser at 700 nm and viewing with a black and white video camera at the wavelengths of 800–830 nm.

TABLE III

| Example | Layer 1 | Layer 2 | Layer 3 | Layer 4 |
|---|---|---|---|---|
| 11 | B | W | NR | W |
| 12 | B | W | R | W |
| 13 | B | W | R | W |
| 14 | B | W | R | W |
| 15 | B | W | R | R |
| 16 | B | W | R | W |

| Example | Layer 5 | Layer 6 | Layer 7 | Layer 8 |
|---|---|---|---|---|
| 11 | F | Unused | Unused | Unused |
| 12 | NF1 | Unused | Unused | Unused |
| 13 | NF2 | Unused | Unused | Unused |
| 14 | R | W | R | NF3 |
| 15 | R | W | R | NF4 |

Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

We claim:

1. An encoded microparticle comprising at least three layers made distinguishable from each other by the incorporation of different dyes and/or pigments in said layers, at least one of said layers carrying at leas two dyes and/or pigments further distinguishable from each other, at least one of said at least two dyes and/or pigments comprising a near infrared fluorophore.

2. An encoded microparticle is in claim 1 wherein said at least three layers are encoded via a color sequence of visually color-distinguishable dyes and/or pigments, wherein the at least one layer carrying at least two dyes and/or pigments comprises a near infrared fluorophore and at least one visual dye or colorant, wherein said near infrared fluorophore is selected from the classes of phthalocyanines, naphthalocyanines and squaraines having the following formulae:

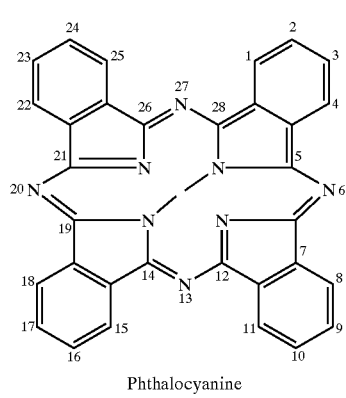

Phthalocyanine

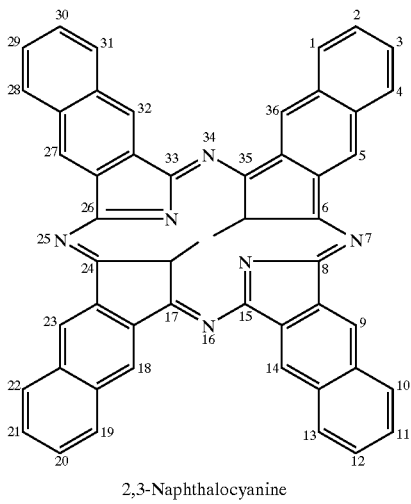

2,3-Naphthalocyanine

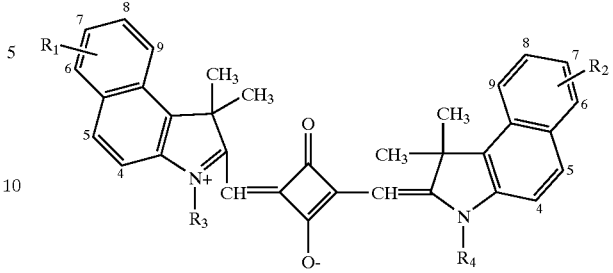

(IIa)

respectively, covalently bonded to a moiety selected from the group consisting of hydrogen, halometals, organometallic groups, and oxymetals selected from the group consisting of AiCl, AlBr, AlF, AlOH, AlOR, AlSR$_5$, Ge, Ge(OR$_6$), Ga, InCl, Mg, SiCl$_2$, SiF$_2$, SnCl$_2$, Sn(OR$_6$)$_2$Si(OR$_6$)$_2$, Sn(SR$_6$)$_2$, Si(SR$_6$)$_2$, and Zn, wherein R$_5$ and R$_6$ are selected from the group consisting of hydrogen, alkyl, aryl, heteroaryl, lower alkanoyl, trifluoroacetyl, and groups of the formulae:

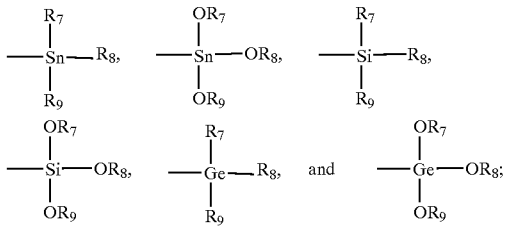

wherein

R$_7$, R$_8$ and R$_9$ are independently selected from the group consisting of alkyl, phenyl and phenyl substituted with the group consisting of lower alkyl, lower alkoxy and halogen;

X is selected from the group consisting of oxygen, sulfur, selenium, tellurium and a group of the formula N(R$_{10}$), wherein R$_{10}$ is selected from the group consisting of hydrogen, cycloalkyl, alkyl, acyl, alkylsulfonyl, and aryl or R$_{10}$ and R taken together form an aliphatic or aromatic ring with the nitrogen atom to which they are attached;

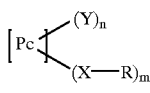  (I)

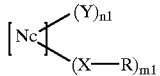  (II)

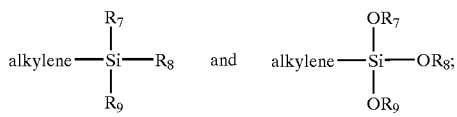 (III)

wherein Pc and Nc represent the phthalocyanine and naphthalocyanine moieties of Formulae Ia and IIa, Y is selected from alkyl, halogen or hydrogen;

R is selected from the group consisting of unsubstituted or substituted alkyl, alkenyl, alkynyl, C$_3$–C$_8$ cycloalkyl, aryl, heteroaryl,

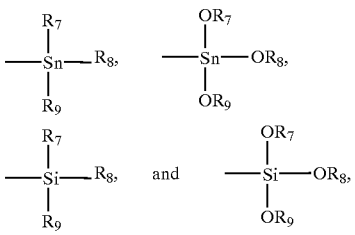

(X—R) moiety is selected from three group consisting of alkylsulfonylamino, arylsulfonylamino, a group selected from the formula —X(C$_2$H$_4$O)$_z$R$^1$,

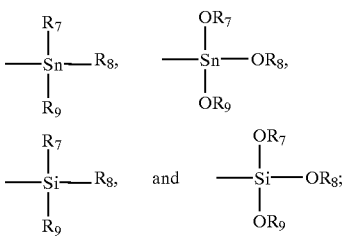

wherein

R$^1$ selected from the group consisting of hydrogen and R as defined above;

z is an integer of from 1–4;

R$_1$ and R$_2$ are independently selected from the group consisting of hydrogen, lower alkyl, lower alkoxy, halogen, aryloxy, lower alkylthio, arylthio, lower alkylsulfonyl, arylsulfonyl, lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy, and a group having the formulae:

R$_3$ and R$_4$ are independently selected from the group consisting of hydrogen, lower alkyl, alkenyl and aryl, n and m are an integer from 0–16, and $n_1$ and $m_1$ are an integer from 0–24, provided that the sums of n+m and $n_1+m_1$ are 16 and 24, respectively, and wherein when n, $m_1$ and $m_1$ is 0 the respective moiety is absent.

3. An encoded microparticle as in claim 2 comprising at least three colored layers and being between about 1 and about 1000 microns in its broadest dimension across the color sequence.

4. An encoded microparticle as in claim 3 wherein said distinguishable layers of said microparticles are formed by a series of substantially uniform layers having a thickness less than about 100 microns.

5. An encoded microparticle as in claim 4 which is essentially spherical.

6. A method of tagging a substance with microparticles, comprising incorporating into said substance microparticles each comprising at least three layers made distinguishable from each other by the incorporation of different dyes and/or pigments in said layers, at least one of said layers carrying at least two dyes and/or pigments further distinguishable from each other, at least one of said at least two dyes and/or pigments further comprising a near infrared fluorophore.

7. A method of tagging a substance as in claim 6 wherein said at least three layers are encoded via a color sequence of visually color-distinguishable dyes and/or pigments to provide a plurality of distinguishable color-coded layers, wherein at least one color-coded layer further includes at least one near infrared fluorophore.

8. The method of claim 7 wherein each of said microparticles comprises a solid nucleus concentrically coated with distinguishable layers of different colors and at least two near infrared fluorophores, aid said layers have a thickness of from about 5 microns to about 15 microns.

9. A method as in claim 7 wherein at least one of said distinguishable layers comprises both a near infrared fluorophore and a visual dye or colorant, wherein the near infrared fluorophore is selected from the classes of phthalocyanines, naphthalocyanines and squaraines corresponding to following formula:

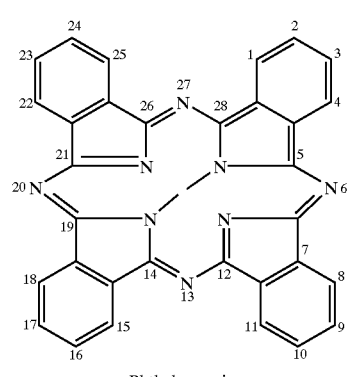
(I)

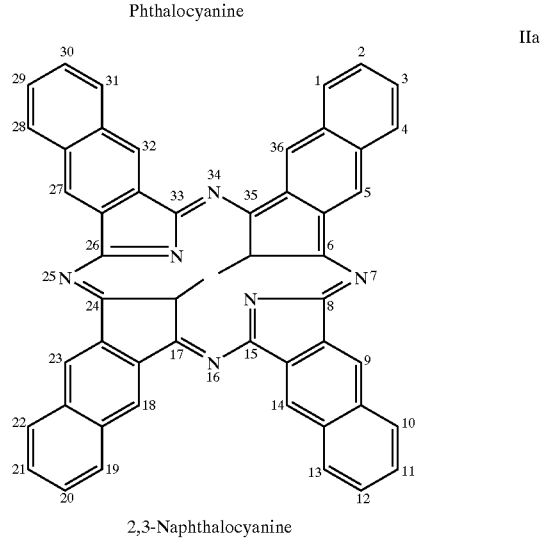

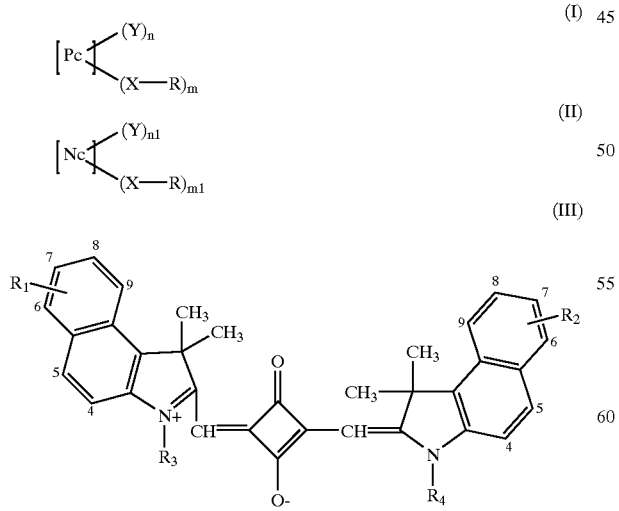

wherein Pc and Nc represent the phthalocyanine and naphthalocyanine moieties of Formulae Ia and IIa, respectively, covalently bonded to a moiety selected from the group consisting of hydrogen, halometals, organometallic groups, and oxymetals selected from the group consisting of AlCl, AlBr, AlF, AlOH, $AlOR_5$, $AlSR_5$, Ge, $Ge(OR_6)$, Ga, InCl, Mg, $SiCl_2$, $SiF_2$, $SnCl_2$, $Sn(OR_6)_2$, $Si(OR_6)_2$, $Sn(SR_6)_2$, $Si(SR_6)_2$, and Zn, wherein $R_5$ and $R_6$ are selected from the group consisting of hydrogen, alkyl, aryl, heteroaryl, lower alkanoyl, trifluoroacetyl, and groups of the formulae:

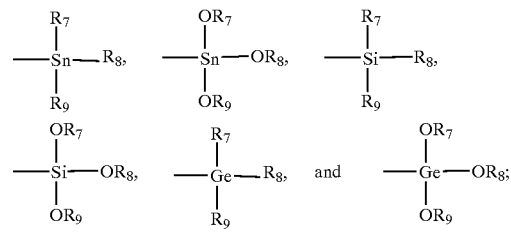

wherein
$R_7$, $R_8$ and $R_9$ are independently selected from the group consisting of alkyl, phenyl and phenyl substituted with the group consisting of lower alkyl, lower alkoxy and halogen;
X is selected from the group consisting of oxygen, sulfur, selenium, tellurium and a group of the formula $N(R_{10})$, wherein $R_{10}$ is selected from the group consisting of hydrogen, cycloalkyl, alkyl, acyl, alkylsulfonyl, and aryl or $R_{10}$ and R taken together form an aliphatic or aromatic ring with the nitrogen atom to which they are attached;

Y is selected from alkyl, halogen or hydrogen;

R is selected from the group consisting of unsubstituted or substituted alkyl, alkenyl, alkynyl, $C_3$–$C_8$ cycloalkyl, aryl, heteroaryl,

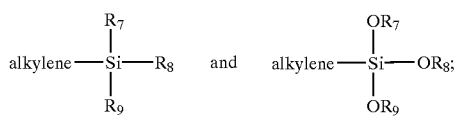

(X—R) moiety is selected from the group consisting of alkylsulfonylamino, arylsulfonylamino, a group selected from the formulae —$X(C_2H_4O)_zR^1$,

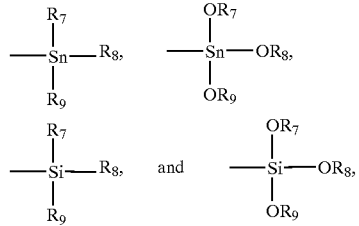

wherein
  $R_1$ is selected from the group consisting of hydrogen and R as defined above;
  z is an integer of from 1–4;
  $R_1$ and $R_2$ are independently selected from the group consisting of hydrogen, lower alkyl, lower alkoxy, halogen, aryloxy, lower alkylthio, arylthio, lower alkylsulfonyl, arylsulfonyl, lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy, and a group having the formulae:

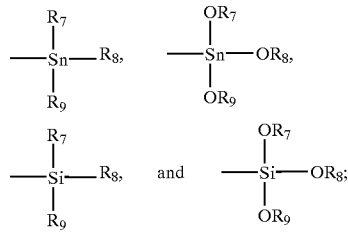

$R_3$ and $R_4$ are independently selected from the group consisting of hydrogen, lower alkyl, alkenyl and aryl;
  n and m are an integer from 0–16, and $n_1$ and $m_1$ are an integer from 0–24, provided that the sums of n+m and $n_1+m_1$ are 16 and 24, respectively, and wherein when n, m, $n_1$ and $m_1$ is 0 the respective moiety is absent.

10. A method as in claim 9 wherein each of said microparticles is about 1 to about 1000 microns at its broadest dimension in the color sequence.

* * * * *

UNITED STATES PATENT AND TRADEMARK OFFICE
CERTIFICATE OF CORRECTION

PATENT NO. : 6,432,715 B1
DATED : August 21, 2003
INVENTOR(S) : Nelson et al.

It is certified that error appears in the above-identified patent and that said Letters Patent is hereby corrected as shown below:

Column 7,
Delete Fig. IIa and insert the following Fig. IIa:

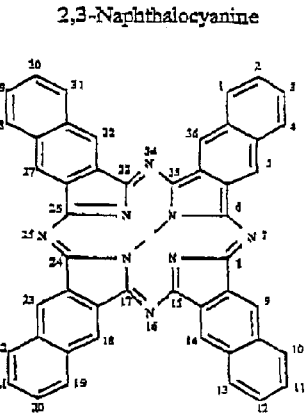

IIa

Column 8,
Line 50, delete "$(Y)n_1 (Y)n$," and replace with -- $(Y)n, (Y)n_1,$ --.

Column 13,
Line 31, delete the period after "isopropanol" and insert a comma.

Column 14,
Line 37, delete "leas" and replace with -- least --.
Line 41, delete "is" and replace with -- as --.

Column 15,
Line 27, delete "AiCl" and insert -- AlCl --.

UNITED STATES PATENT AND TRADEMARK OFFICE
CERTIFICATE OF CORRECTION

PATENT NO.   : 6,432,715 B1
DATED        : August 21, 2003
INVENTOR(S)  : Nelson et al.

It is certified that error appears in the above-identified patent and that said Letters Patent is hereby corrected as shown below:

Column 15 cont'd,
Delete Fig. IIa and insert the following Fig. IIa:

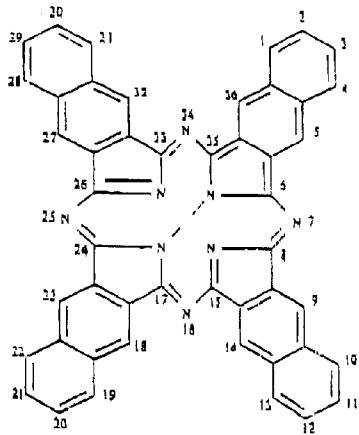

IIa

Column 16,
Line 28, delete "three" and insert -- the --.

Column 17,
Line 4, delete "$n_1m_1$ and $m_1$" and insert -- n, m, $n_1$ and $m_1$ --.
Line 24, delete "further".
Line 35, delete "aid" and insert -- and --.

UNITED STATES PATENT AND TRADEMARK OFFICE
CERTIFICATE OF CORRECTION

PATENT NO.    : 6,432,715 B1
DATED         : August 21, 2003
INVENTOR(S)   : Nelson et al.

It is certified that error appears in the above-identified patent and that said Letters Patent is hereby corrected as shown below:

Column 18,
Delete Fig. IIa and insert the following Fig. IIa:

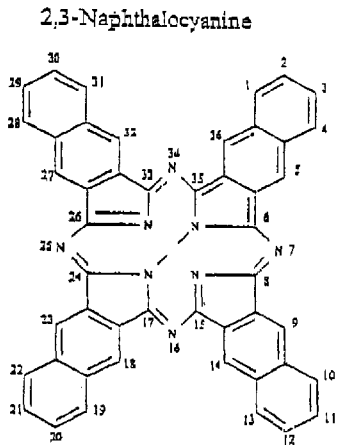

Signed and Sealed this

Sixteenth Day of September, 2003

JAMES E. ROGAN
*Director of the United States Patent and Trademark Office*